United States Patent [19]

Thygesen

[11] Patent Number: 5,305,787
[45] Date of Patent: Apr. 26, 1994

[54] DISK VALVE WITH IMPROVED DISK MOUNTING

[75] Inventor: Theodore E. Thygesen, Downers Grove, Ill.

[73] Assignee: C & S Valve Company, Westmont, Ill.

[21] Appl. No.: 13,057

[22] Filed: Feb. 3, 1993

[51] Int. Cl.⁵ .............................................. F16K 15/03
[52] U.S. Cl. ................................... 137/527; 137/554; 137/556
[58] Field of Search .................. 137/556, 527, 527.8, 137/554

[56] References Cited

U.S. PATENT DOCUMENTS

| | | | |
|---|---|---|---|
| 215,887 | 5/1879 | Crossman | 137/527.8 |
| 2,578,590 | 12/1951 | Perrault | 137/527.8 X |
| 2,900,998 | 8/1959 | Lortz | 137/527.8 X |
| 2,928,697 | 3/1960 | Bennett | 137/527.8 X |
| 2,934,084 | 4/1960 | Adams | 137/527.8 X |
| 3,155,112 | 11/1964 | Rosser | 137/527.8 |
| 3,230,971 | 1/1966 | Rosaen | 137/527 X |
| 4,862,910 | 9/1989 | Lee | 137/527 X |

FOREIGN PATENT DOCUMENTS 1305717 4/1962 France ...................... 137/527

*Primary Examiner*—Robert G. Nilson
*Attorney, Agent, or Firm*—Fitch, Even, Tabin & Flannery

[57] ABSTRACT

An eccentric disk valve has return springs and indicators located outside of the valve housing. The valve disk is directly seated on the housing and the valve seat of the housing is described as a section of a right circular cone whose central axis is aligned with the axis of flow through the valve housing.

18 Claims, 3 Drawing Sheets

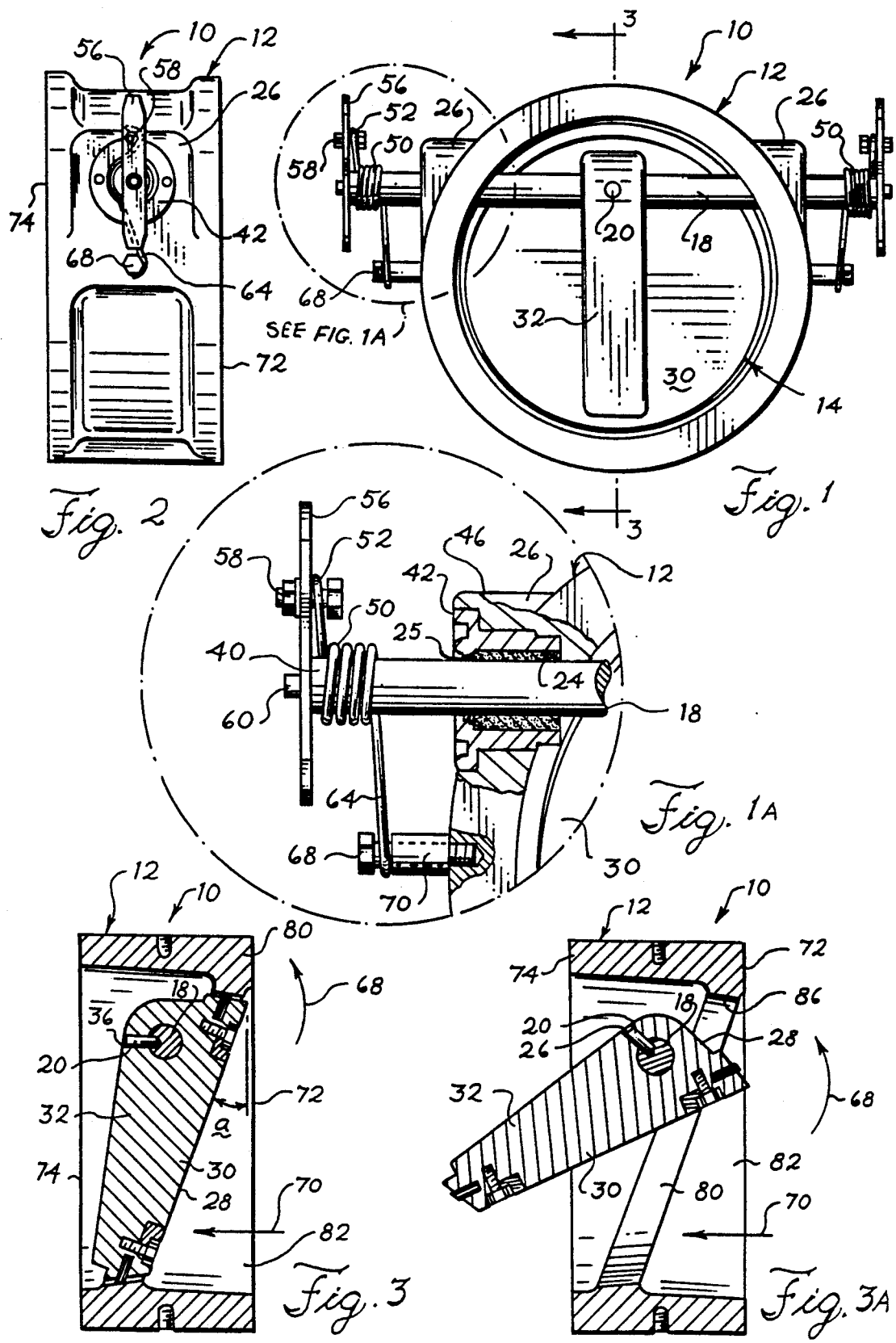

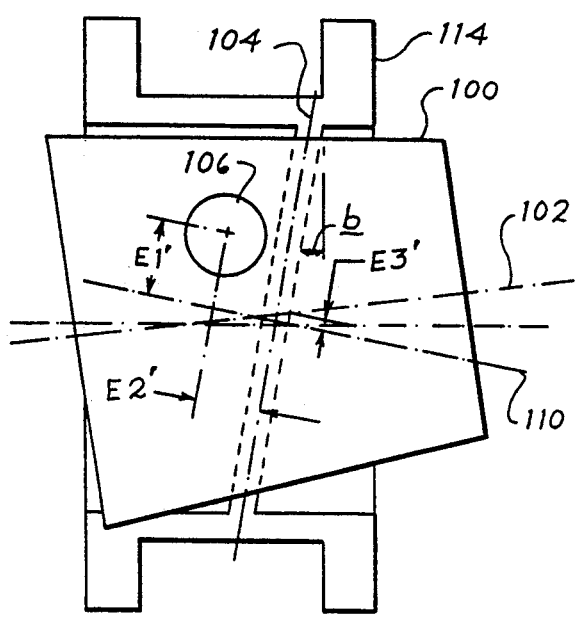
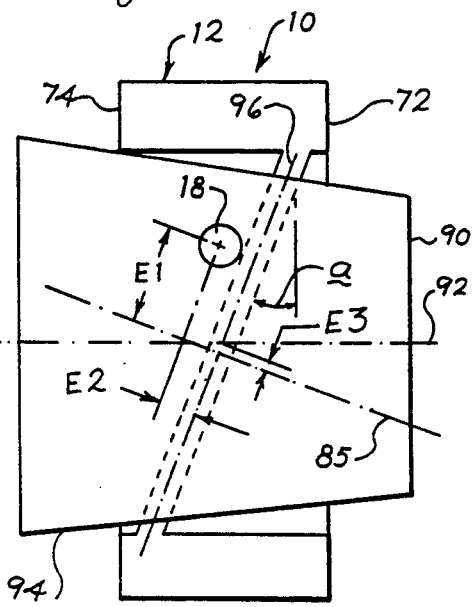
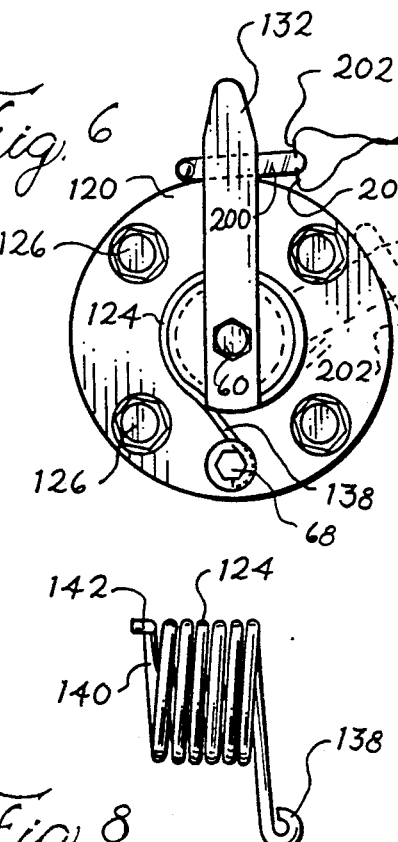
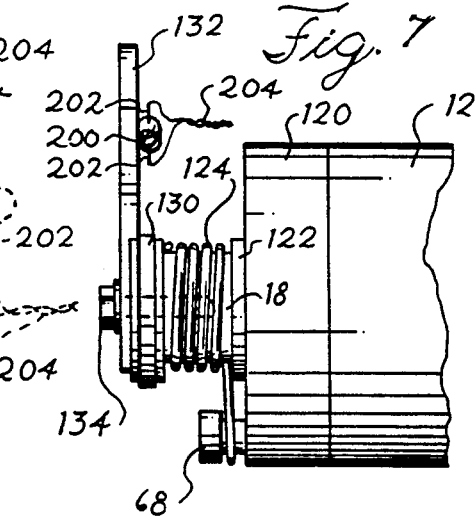
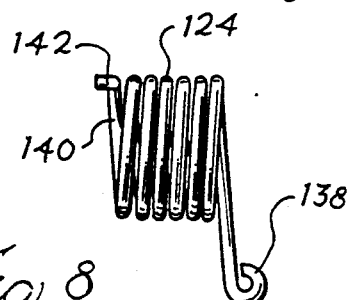
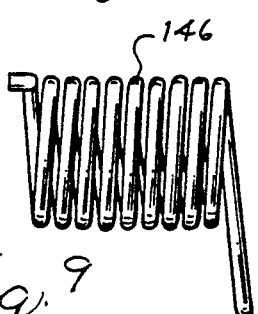

DISK VALVE WITH IMPROVED DISK MOUNTING

BACKGROUND OF THE INVENTION

1. Field of the Invention

The present invention pertains to disk valves, and in particular to such valves mounted in housings so as to have an eccentric pivot axis.

2. Description of the Related Art

Over the years, specialized designs of disk valves have evolved to meet a variety of needs. In one type of such valve, adapted for use as a check valve, a plate-like valve disk is mounted for rotation about an axis which does not pass through the center of the disk, and is therefore referred to as an "eccentric" axis of rotation. The valve disk mates with an annular valve seat disposed within a conduit-like housing having a central axis. One example of this type of valve is described in U.S. Pat. No. 4,003,394. As explained in the background of that patent, the construction of these types of valves is complex, and attempts have been made over the years to simplify the valve construction. However, further simplifications are still being sought today.

Although the valve disk is of relatively simple construction, being formed basically from a flat plate, fabrication of the valve seat (which is formed in the valve housing) requires a fairly complex machining operation, even though the seating surface is conical, i.e., defines part of a cone. The complexities of fabrication arise, in part, because the axis of the cone defining the seating surface is inclined so as to form an acute angle with the central axis of the valve housing. The valve seat is also inclined at an angle to the central axis of the housing and usually is also positioned at a non-normal angle to the cone axis. The valve seat is a relatively thin "slice" or planar section of the conical surface, approximating a thin plane, and as such may be described as having an elliptical configuration since it cuts the cone at a non-normal angle to the cone axis. As mentioned in U.S. Pat. No. 4,003,394, attempts have been made to relax the stringent manufacturing tolerances required for such valves.

The eccentric mounting of the valve disk, typical with these types of valves, usually offsets the pivot axis with respect to the center of gravity of the valve disk in such a way as to create an imbalance in the valve disk mounting. The direction of flow through the valve housing is usually chosen to oppose the direction of valve closing. Return springs mounted on the pivot shaft have heretofore been relied upon to ensure valve closing under static flow conditions. The valve return springs have been specially designed for this purpose, despite the significant imbalance of the valve disk inherent in valves of this type. Such designs compromise other performance features desirable in a valve of the type considered. For example, water hammer presents serious problems in many industrial applications and can cause a significant amount of damage if appropriate steps are not taken. Where water hammer presents a critical problem, ameliorating measures such as employing conventional twin-flapper check valves have been employed, albeit at the sacrifice of certain performance capabilities of the eccentric disk valves.

SUMMARY OF THE INVENTION

It is an object of the present invention to provide a valve assembly having a valve disk mounted within a housing for rotation about an axis which does not correspond with either the center of the disk or the centerline of the housing.

Another object of the present invention is to provide a valve assembly of the above-described type having an improved rate of response.

A further object of the present invention is to provide a valve of the above-described type, with service parts located outside of the valve housing for ready replacement or modification.

These and other objects according to principles of the present invention, which will become apparent from studying the appended description and drawings, are provided in a valve assembly, comprising:

a housing defining a tubular flow passageway extending along a flow axis;

a reference plane extending through said housing, perpendicular to the flow axis;

a valve disk having attachment means for attaching to a pivot shaft;

a double-ended pivot shaft extending through said housing with end portions lying outside said housing, said pivot shaft connected to said attachment means for mounting said valve disk for pivoting within said housing between closed and open positions, with said valve disk lying in a seal plane when in said closed position;

said housing including a valve seat engaging said valve disk in said closed position so as to seal said flow passageway and so as to orient the seal plane at an acute angle to the flow axis; and spring bias means mounted on at least one of said pivot shaft end portions, outside of said housing for biasing said valve disk toward one of said closed and said open positions.

BRIEF DESCRIPTION OF THE DRAWINGS

FIG. 1 is a front elevational view of a valve assembly illustrating principles according to the present invention;

FIG. 1A is a fragmentary portion of FIG. 1 shown on an enlarged scale;

FIG. 2 is a side elevational view of the valve assembly;

FIG. 3 is a cross-sectional view taken along the line 3—3 of FIG. 1;

FIG. 3A is a view similar to FIG. 3 but showing the valve in an open position;

FIG. 4 is a schematic diagram corresponding to a cross-sectional view of a prior art valve assembly, showing construction parameters of the valve components;

FIG. 5 is a schematic view of the valve of FIG. 3 showing principles of construction;

FIG. 6 shows an alternative embodiment of a valve assembly;

FIG. 7 is a front elevational view thereof;

FIG. 8 is a front elevational view of a coil spring of FIGS. 6 and 7;

FIG. 9 is a front elevational view of an alternative embodiment of the coil spring.

DETAILED DESCRIPTION OF THE PREFERRED EMBODIMENT

Figure 10:
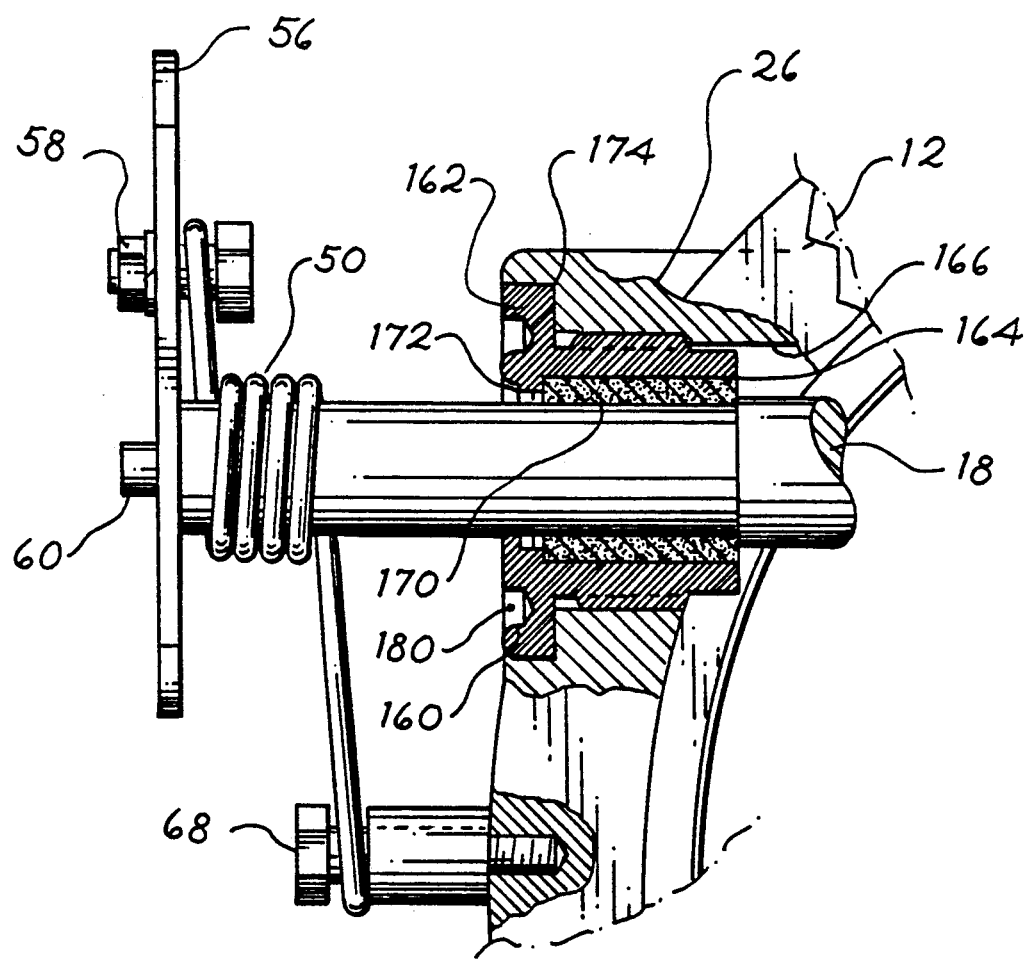
FIG. 10 is a cross-sectional view of an alternative embodiment according to principles of the present invention.

Referring now to the drawings, and initially to FIGS. 1 and 2, a valve assembly is generally indicated at 10. As will be seen, the valve assembly 10 preferably functions as a check valve, and has a valve member directly seated on the valve housing, i.e., a "metal seated" valve member, which is eccentrically mounted (i.e., mounted with multiple offsets, as will be explained herein with reference to FIG. 5). The valve assembly 10 includes a valve body or housing generally indicated at 12, and a valve member generally indicated at 14 which has a substantially circular, disk-like configuration and which is pivotally mounted within housing 12. The valve member 14 is fixedly mounted to shaft 18 by a pin 20 or other suitable fastener, and shaft 18 is rotatably mounted in housing 12 by bearings 24 mounted in housing shoulders 26. The valve member 14 is thereby movable between the closed position shown in FIG. 3 and the open position shown in FIG. 3A.

As indicated in FIGS. 3, 3A, valve member 14 has a body 28 preferably of unitary one-piece construction. As can be seen by comparing FIGS. 1, 3 and 3A, the valve member 14 includes a circular disk portion 30 and a raised shoulder portion 32. As shown in FIG. 1, pin 20 is inserted in a passageway 36 so as to enter a blind passageway formed in shaft 18. If desired, the valve member can be made as a weldment or otherwise fabricated from individual components.

Referring now to FIG. 1A, shaft 18 passes through shoulder 26 and has a free end 40 extending outside of housing 12. An end cap 42 is mounted in a recess formed in shoulder 26, adjacent the aperture for shaft 18, and is secured thereto with conventional fasteners. Seals, preferably in the form of 0-rings 25, are located at the point where shaft 18 exits housing 12. The seals 25 could also take the form of self-energized Uncups or pressure-energized Uncups, if desired. Another gasket, preferably in the form of an O-ring 46, is also employed in the valve assembly.

A mirror image of the end cap and shoulder 26 appearing in FIG. 1A is also located on one right hand side of FIG. 1, the valve being symmetric about a vertical centerline drawn through FIG. 1. A coil spring 50 is mounted on each free end 40 of shaft 18. With additional reference to FIG. 6, a first end 52 of spring 50 is secured to an indicator flag 56 by a threaded fastener 58, but could be secured directly to free end 40 if the indicator flag is omitted. As indicated in FIG. 6, indicator 56 is free to rotate with shaft 18 and is fixed thereto by a threaded fastener 60 so as to provide a ready visual indication of the valve position for plant operators and other personnel. As shown in the FIGURES, the indicators are of a relatively simple, rigid flag design. However, with valve assemblies constructed according to principles of the present invention, various sensors or analog or digital circuitry can now be secured to the valve mounting shaft without risk of overheating, contamination or other deleterious effects that would otherwise be encountered if the circuitry were located within the valve. For example, a position indicating circuit, such as a Hall effect sensor, can be mounted to the pivot shaft and coupled to external annunciator circuitry located in a control room. As another example of an indicating circuit which can be substituted for the indicator flag, a mercury switch 200 has electrical leads 202 coupled to an external circuit through conductors 204.

The second end 64 of spring 50 is fixedly secured to housing 12 by threaded fastener 68. Preferably, fastener 68 is secured to a stud 70, so as to maintain the end 64 in a plane generally normal to the central axis of shaft 18. The spring 50 maintains a continuous tension on disk 30, biasing the disk toward the closed position, in the direction of arrow 68 in FIG. 3A. The arrow 70 in FIGS. 3 and 3A indicates the normal flow direction, and accordingly, the end 72 of housing 12 is referred to here as the upstream end, while the opposed end 74 is referred to here as the downstream end.

Referring to FIGS. 3-5, certain advantages of the valve assembly will be described. It should be noted that the valve assembly, in its preferred form, comprises an automatic check or shutoff valve which permits flow in the downstream direction of arrow 70, but automatically operates to close under reverse flow conditions, i.e., flow in a direction opposite to that of arrow 70. Several features have been incorporated into the valve assembly to enhance the closing operation. In particular, the valve assembly, according to principles of the present invention, is faster operating, anticipating reverse flow conditions, is more reliable in its closing action and requires less external assistance (i.e., bias force) to close. Valves according to principles of the present invention can now be utilized to replace so-called "twin flapper" valves, and in addition, certain manufacturing advantages are possible with valves according to principles of the present invention.

FIGS. 4 and 5 show diagrammatic cross-sectional views suggestive of the cross-sectional views of FIGS. 3 and 3A. FIG. 4 shows a diagram indicating prior art valve construction, whereas FIG. 5 indicates valve construction according to principles of the present invention. The constructions indicated in FIGS. 4 and 5 illustrate formation of the valve seat and also mounting of the valve disk. With reference to FIGS. 3 and 3A, an internal, annular wall 80 is formed within the valve housing. The wall 80 is located within the interior wall 82. As indicated in FIGS. 3 and 3A, wall 80 is preferably formed as an integral portion of housing 12, but could be separately formed as a weldment if desired. As can be seen in FIGS. 3 and 3A, wall 80 is formed at an acute angle to the upstream end 72 of the valve housing.

In FIG. 5, the construction line 85, herein referred to as the "seal axis", is drawn perpendicular to wall 80, through the approximate center of the wall. The wall 80 defines an interior opening or an interior surface 86 which comprises the valve seat. The valve seat 86 is formed in the shape of a section of a truncated cone 90, as illustrated in FIG. 5. Cone 90 has a centerline 92 and an outer conical surface 94. The valve seat 86 comprises a portion of conical surface 94 defined by spaced parallel planes. As can be seen in FIG. 5, wall 80 is formed at an angle to centerline 92 of the cone and the centerline 96 of wall 80. Accordingly, the "seal plane" 96 of the valve assembly (see FIG. 5) can be understood to have an elliptical configuration.

Referring again to FIG. 5, three distances, E1-E3, illustrate three "eccentricities" or "off sets" associated with the "eccentric disk" valve design. The distance E1 indicates that the shaft 18 for mounting the valve disk is offset to one side of the disk centerline. According to one aspect of the present invention, the offset E1 is in an upward direction so that the center of rotation of shaft 18 is located above the center (i.e., center of mass) of the valve disk. As also shown in FIG. 5, the center of rotation of shaft 18 is offset a distance E2 to one side of the seal plane 96 of the valve assembly. A third offset is also shown in FIG. 5. The "seal axis" or valve disk centerline 85 is spaced below the intersection of the seal plane 96 and the cone centerline 92 by a distance E3.

With reference now to a prior art valve illustrated in FIG. 4, a cone 100 defining the valve seat has a center axis 102. The seal plane 104 is offset from the mounting shaft axis 106 by an offset distance E2'. The seal axis 110 is located below the intersection of seal plane 104 and the axis 102 of cone 100, by an offset distance E3'. As can be seen in FIG. 4, the cone axis 102 is inclined in an upward direction, whereas the cone axis of FIG. 5 is generally aligned with the central axis of housing 12. By comparing FIGS. 4 and 5, it can be seen that the offset distance E2 of the present invention is substantially less than the offset distance E2' of the prior art valve construction and, with the larger angular offset a, the shaft 18 is more nearly located above the center of valve disk 20 than in the prior art, thus allowing the center of gravity of the valve disk to be positioned close to a point located directly below the shaft axis. As a result, the spring force required to hold the valve in a closed position is minimized. In effect, this improvement changes the function of the return springs. Before, the return springs were needed to ensure that the valve was fully closed in a static flow condition, overcoming the inherent imbalance in the valve design.

In comparing FIGS. 4 and 5, it can be seen that the seal plane 104 in FIG. 4 is offset from the adjacent upstream end 114 of the valve housing by a relatively small acute angle b. In contrast, the seal plane 96 of housing 12 in FIG. 5 is inclined from the upstream end 72 by a larger acute angle a. By way of example, the disk plane angle (angle b in FIG. 4) was approximately 10 degrees over a wide variety of prior art valve sizes. The disk angle (a as shown in FIG. 5) for valve assemblies according to principles of the present invention are larger, usually several times larger, i.e., 20-35 degrees, depending on valve size. The disk plane angle for valves constructed according to principles of the present invention range between 15 degrees and 35 or more degrees. In the valve construction according to principles of the present invention (as illustrated in FIG. 5), the valve disk will have a shorter distance to travel when moved to a closed position, as compared to the prior art arrangement (diagrammatically illustrated in FIG. 4).

As will be appreciated by those skilled in the art, the milling operation for the valve seat shown in FIG. 5 is simpler and its accurate construction more economically obtained than the design illustrated in FIG. 4, where the cone axis is inclined to the central axis of the valve housing. As can be seen from studying FIG. 5, the shaft 18 is moved immediately adjacent the valve disk, and the shaft is made as small as possible to as to minimize the offset distance E2 between the valve axis and the seal plane. In fact, although not shown in the diagram of FIG. 5, a vertical line passing through the center of shaft 18 comes close to intersecting the point of intersection of seal plane 96 and the cone axis 92.

With the present invention, the weight of the valve disk is aligned very nearly underneath the centerline of shaft 18. With the increase of angle of inclination of valve disk relative to the axis of the valve housing, and the close spacing of the shaft 18 to the valve disk, the return springs can now be designed so as to initiate valve closing before a substantial reverse flow is experienced. By increasing the angle of the disk plane, the disk plate is closed more quickly.

Advantages in construction techniques made possible by the present invention are especially important for valves which are "metal seated", rather than "rubber" or "gasket" seated. As will be appreciated by those skilled in the art, the manufacturing tolerances for metal seated valves (especially so-called "eccentric disk" valves of the type contemplated by the present invention having internal valve disks seated at angles to the axis of the valve housing) require fairly high machining tolerances for satisfactory performance. As those skilled in the art will appreciate, metal seated valves can operate in higher temperature product environments and are not limited by the characteristics of the resilient seating material of so-called "rubber seated" valves and valves seated with other types of gasket materials. With the valve design according to principles of the present invention, the valve seat may be machined in a standard lathe, and close tolerances may be more easily attained and held during a production run.

With valve assemblies constructed according to principles of the present invention, the return springs are no longer devoted to insuring proper valve closing in static flow conditions, but can now be designed to assist in providing an early closing of the valve during reverse flow conditions, which is an important feature in reducing or eliminating the effects of water hammer. Because the early closing features valves constructed according to principles of the present invention provide improved reliability and faster response times. Also, with valve assemblies constructed according to principles of the present invention, greater flow rates can be accommodated for a valve housing of a particular size, which allows a more efficient transport of fluid throughout a system.

As mentioned, the central axis of the support shaft 18 is located as close as possible above the center of the mass of the valve disk. Because of the improved balance of the valve disk and the faster response times under reverse flow conditions, the support shaft through the valve disk can be made smaller, which further aids in reducing the separation distance E2 of shaft 18 from the center of mass of the valve disk. Further, as noted above, the seal plane 96 is inclined at greater angles from the normal to the valve housing axis, i.e., to the upstream end 72 of the valve housing. Thus, the shaft 18 is brought into better alignment with the center of mass of the valve disk.

As mentioned, the return springs 50 of the valve disk continually exert pressure on the valve disk in the direction of arrow 68 (shown in FIGS. 3 and 3A), which biases the valve disk toward a closed position. Because the valve disk is better balanced, the springs 50 can be optimized for faster initial valve response to a backflow condition. Also, because of the increased angular positioning of the valve disk (as indicated by the angle a in FIG. 5), valve closing can be accomplished more quickly. According to one aspect of the present invention, the springs 50 are located outside of the valve housing and may be readily serviced, or modified, without requiring disassembly of the valve from the pipe line in which it is installed, as was previously required. With valve assemblies constructed according to principles of the present invention, the return springs are no longer maintained in contact with the medium flowing through the valve and thus the return springs are not subjected to deleterious media temperatures, corrosives or abrasives present in the media environment.

FIGS. 6-9 show alternative forms of the invention wherein an end housing 120 is fitted to valve housing 12 by threaded fasteners 126 (see FIG. 6). End housing 120 includes a shoulder 122 (see FIG. 7) to aid in providing axial containment for a coil spring 124 mounted on shaft 18. Shoulder 122 cooperates with a retaining washer 130 which, along with indicator flag 132, is secured to shaft 18 by threaded fastener 134.

As shown in FIG. 8, coil spring 124 has a first end 138 with a loop for engagement with threaded fastener 68. Spring 124 has a second end 140 with a transverse stub portion 142 for engagement with an aperture in retainer washer 130. Preferably, the retainer washer 130 is keyed to shaft 18 to prevent rotation of end 140 of spring 124 relative to shaft 18. As mentioned, spring 124 is preferably preloaded with the valve disk in the closed position, and with spring tension increasing as the valve disk opens. With the valve assembly according the principles of the present invention, the return springs can be quickly and easily replaced for operations with different media, and different pressure and flow rates, for example.

FIG. 9 shows an alternative form of a return spring, identified by reference numeral 146. Different return springs can offer adjustments in the closing forces of the valve disk in either the open or the closed position, or both. If desired, multiple springs can be arranged concentric with shaft 18 and affixed to a valve housing and indicator flag in the manner shown.

Another example of a valve according to principles of the present invention is illustrated in FIG. 10. End cap 160 has an enlarged head 162 and a threaded body portion 164 threadably engaged with a threaded passageway 166 formed in shoulder 26. The end cap 160 defines an enlarged internal bore receiving a sleeve bearing 170 disposed in contact with shaft 18. A first seal 172 is located between the enlarged head 162 and the sleeve bearing 164. A second gasket 174 is located behind the enlarged head 162. By removing threaded fasteners 48, 60 and 68, the indicator flag 56 and spring 50 can be removed from the valve assembly. By engaging the blind apertures 180 in end cap 160 with an appropriate tool, the end cap can be threadingly disengaged from the valve housing, and the end cap, gaskets and bearing can be removed as a cartridge assembly, significantly expediting maintenance procedures throughout the life of the valve assembly.

The drawings and the foregoing descriptions are not intended to represent the only forms of the invention in regard to the details of its construction and manner of operation. Changes in form and in the proportion of parts, as well as the substitution of equivalents, are contemplated as circumstances may suggest or render expedient; and although specific terms have been employed, they are intended in a generic and descriptive sense only and not for the purposes of limitation, the scope of the invention being delineated by the following Claims.

What is claimed is:

1. A valve assembly, comprising:
   a housing defining a tubular flow passageway extending along a flow axis;
   a reference plane extending through said housing, perpendicular to the flow axis;
   a valve disk having attachment means for attaching to a pivot shaft;
   a double-ended pivot shaft extending through said housing with end portions lying outside said housing, said pivot shaft connected to said attachment means for mounting said valve disk for pivoting within said housing between closed and open positions, with said valve disk lying in a seal plane when in said closed position;
   said housing including a valve seat engaging said valve disk in said closed position so as to seal said flow passageway and so as to orient the seal plane at an acute angle to the flow axis; and
   spring bias means mounted on at least one of said pivot shaft end portions, outside of said housing for biasing said valve disk toward one of said closed and said open positions.

2. The valve assembly of claim 1 wherein said housing and valve seat are of one-piece, monolithic construction.

3. The valve assembly of claim 1, further comprising indicator means mounted on at least one of said pivot shaft end portions, outside of said housing so as to indicate the position of the valve disk.

4. The valve assembly of claim 3 wherein said indicator means comprises an indicator flag fixedly mounted to said pivot shaft.

5. The valve assembly of claim 3 wherein said indicator means comprises an indicating circuit means for sending a signal to an external circuit indicating position of the valve disk.

6. The valve assembly of claim 4 wherein said spring bias means comprises a coil spring having a first end mounted to said indicator flag and a second end attached to said housing.

7. The valve assembly of claim 1 wherein said spring bias means comprises a coil spring having a first end mounted on one of said pivot shaft end portions, and a second end attached to said housing.

8. The valve assembly of claim 1 wherein said pivot shaft extends through an opening defined by said housing, and said valve assembly further comprises a gasket adjacent said opening so as to seal said pivot shaft with respect to said housing.

9. The valve assembly of claim 8 further comprising an end cap removably mounted to said housing adjacent said opening and cooperating with said housing so as to retain the gasket in place, between said pivot shaft and said housing.

10. The valve assembly of claim 1 wherein said pivot shaft extends through an opening defined by said housing, and said valve assembly further comprises a bearing received in said opening, between said pivot shaft and said housing.

11. The valve assembly of claim 10 further comprising an end cap removably mounted to said housing adjacent said opening and cooperating with said housing so as to retain the bearing in place, between said pivot shaft and said housing.

12. A valve assembly, comprising:
   a housing defining a tubular flow passageway extending along a flow axis;
   a reference plane extending through said housing, perpendicular to the flow axis;
   a valve disk having attachment means for attaching to a pivot shaft;
   a pivot shaft supported by said housing and connected to said attachment means for mounting said valve disk for pivoting within said housing between closed and open positions, with said valve disk lying in a seal plane when in said closed position;

said housing including a valve seat engaging said valve disk in said closed position so as to seal said flow passageway and so as to orient the seal plane at an acute angle to the flow axis, said valve seat comprising a section of a right circular cone whose central axis is aligned with the flow axis.

13. The valve assembly of claim 12 wherein said housing and valve seat are of one-piece, monolithic construction.

14. The valve assembly of claim 12 wherein said seal plane forms an angle with the flow axis ranging between 15 degrees and 35 degrees.

15. The valve assembly of claim 12 wherein said attachment means comprises a shoulder extending from said valve disk, centrally located between said ends of said pivot shaft and defining a bore through which said pivot shaft extends.

16. A valve assembly, comprising:
- a housing defining a tubular flow passageway extending along a generally horizontally extending flow axis;
- a generally vertically extending reference plane extending through said housing, perpendicular to the flow axis;
- a valve disk having attachment means for attaching to a pivot shaft and a center, with a valve disk centerline passing through the center, generally perpendicular to the valve disk;
- a pivot shaft extending generally horizontally through said housing and connected to said attachment means for mounting said valve disk for pivoting within said housing between closed and open positions, with said valve disk lying in a seal plane when in said closed position;
- said housing including a valve seat integrally formed therewith engaging said valve disk in said closed position so as to seal said flow passageway and so as to orient the seal plane at an acute angle to the reference plane ranging between 15 degrees and 35 degrees, said housing and valve seat being of one-piece, monolithic construction
- said attachment means and said pivot shaft are located to one side of the flow axis, adjacent a portion of the valve disk which is moved toward and away from the flow axis as the valve disk is moved to open and closed positions, respectively;
- said attachment means and said pivot shaft are located to one side of the seal plane; and
- said valve disk centerline is spaced below the intersection of said seal plane and a generally horizontal plane passing through the flow axis.

17. The valve assembly of claim 16 wherein said valve disk has generally unequal portions extending above and below a horizontal plane passing through the flow axis so that a center of gravity of the valve disk is located substantially below said pivot shaft.

18. The valve assembly of claim 16 wherein said attachment means comprises a shoulder extending from said valve disk, centrally located between said ends of said pivot shaft and defining a bore through which said pivot shaft extends.

* * * * *